US012328135B2

(12) United States Patent
Rowell et al.

(10) Patent No.: US 12,328,135 B2
(45) Date of Patent: Jun. 10, 2025

(54) RADIO FREQUENCY SCANNER SYSTEM AND METHOD FOR MOBILE NETWORK TESTING

(71) Applicant: Rohde & Schwarz GmbH & Co. KG, Munich (DE)

(72) Inventors: Corbett Rowell, Munich (DE); Manuel Mielke, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 427 days.

(21) Appl. No.: 17/817,510

(22) Filed: Aug. 4, 2022

(65) Prior Publication Data

US 2023/0075053 A1 Mar. 9, 2023

(30) Foreign Application Priority Data

Sep. 3, 2021 (EP) .................................. 21194795

(51) Int. Cl.
*H04B 1/18* (2006.01)
*H01Q 3/24* (2006.01)
(Continued)

(52) U.S. Cl.
CPC ................. *H04B 1/18* (2013.01); *H01Q 3/24* (2013.01); *H04B 1/1607* (2013.01); *H04W 16/18* (2013.01); *H04W 24/10* (2013.01)

(58) Field of Classification Search
CPC .......... H04B 1/16; H04B 1/1638; H04B 1/18; H04B 1/3805; H04B 17/00; H04B 17/15;
(Continued)

(56) References Cited

U.S. PATENT DOCUMENTS 7,019,691 B1 *  3/2006  Soltanian ............. H04B 1/7075
                                                      342/368
8,160,571 B2 *  4/2012  Griff ....................... H04B 17/27
                                                      455/425

(Continued)

FOREIGN PATENT DOCUMENTS

CN      106093847 A      11/2016
CN      108632868 A      10/2018
(Continued)

OTHER PUBLICATIONS

3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio Measurement Collection for Minimization of Drive Tests (MDT); Overall Description; 3GPP TS 37.320, Mobile Competence Centre, France, Jul. 9, 2021.
(Continued)

*Primary Examiner* — Quochien B Vuong
(74) *Attorney, Agent, or Firm* — CHRISTENSEN O'CONNOR JOHNSON KINDNESS PLLC

(57) ABSTRACT

The present disclosure relates to a RF scanner system for mobile network testing. The scanner system comprises a switched directional antenna assembly, an RF receiver, and a positioning antenna assembly. The assembly includes several directional antennas oriented in different directions. The directional antennas are connected to at least one switch that is controlled by the RF receiver. The assembly is configured to receive a GNSS signal. The RF receiver is configured to receive the GNSS signal from the assembly. The RF receiver is configured to record information of the switching state of the switch. The RF receiver is configured to gather information of the position and/or bearing. The RF receiver is configured to combine the information of the switching state, a baseband signal and the information of the
(Continued)

position and/or bearing, thereby generating output metadata. Further, a method of mobile network testing is described.

19 Claims, 3 Drawing Sheets

(51) Int. Cl.
| | | |
|---|---|---|
| *H04B 1/16* | (2006.01) | |
| *H04W 24/00* | (2009.01) | |
| *H04W 16/18* | (2009.01) | |
| *H04W 24/10* | (2009.01) | |

(58) Field of Classification Search
    CPC ...... H04B 17/20; H04B 17/29; H04B 17/309;
              H04B 17/318; H04W 16/00; H04W
              24/00; H04W 24/08; H04W 64/00; H01Q
              3/00; H01Q 3/24; G01S 3/02; G01S 5/02;
              G01S 5/0205; G01S 5/0221
    See application file for complete search history.

(56) References Cited

U.S. PATENT DOCUMENTS

| | | | |
|---|---|---|---|
| 10,651,956 | B2 | 5/2020 | Hisch |
| 11,805,106 | B2* | 10/2023 | Crabtree ............... H04L 9/3239 |
| 2009/0201203 | A1 | 8/2009 | Le Sage et al. |
| 2014/0327579 | A1 | 11/2014 | Hart et al. |
| 2018/0213355 | A1 | 7/2018 | Smith et al. |
| 2020/0127744 | A1 | 4/2020 | Cho |
| 2020/0413267 | A1 | 12/2020 | Xue et al. |
| 2021/0352573 | A1* | 11/2021 | Nam ..................... H04W 24/02 |

FOREIGN PATENT DOCUMENTS

| | | |
|---|---|---|
| EP | 2096889 A1 | 9/2009 |
| EP | 2589983 A1 | 5/2013 |
| EP | 3553975 A1 | 10/2019 |
| WO | 01/58195 A1 | 8/2001 |

OTHER PUBLICATIONS

Cidronali, A. et al., "Analysis and Performance of a Smart Antenna for 2.45-GHz Single-Anchor Indoor Positioning," IEEE Transactions on Microwave Theory and Techniques, vol. 58, No. 1, Jan. 2010, pp. 21-31.

* cited by examiner

RADIO FREQUENCY SCANNER SYSTEM AND METHOD FOR MOBILE NETWORK TESTING

FIELD OF THE DISCLOSURE

Embodiments of the present disclosure relate to a radio frequency (RF) scanner system for mobile network testing. Further, embodiments of the present disclosure relate to a method of mobile network testing by using a scanner system.

BACKGROUND

In the state of the art, scanner systems for mobile network testing are known that are inter alia used for interference hunting in order to identify a source of interfering signals in a network or for determining the performance of a mobile network. Hence, the network testing can be used in order to identify the coverage of a certain network by analyzing the radio frequency signals emitted from base stations in a certain area.

Typically, the scanner systems comprise at least one radio frequency measurement device that measures the respective radio frequency signals received, wherein these radio frequency signals received are processed and forwarded to a separate analyzing and/or evaluation device for analyzing or rather evaluation purposes. The separate analyzing and/or evaluation device may receive further data/information that is taken into account when analyzing the radio frequency signals received.

According to the industry-standard method used for mobile network scanning, omnidirectional antennas are used for receiving radio frequency signals to be analyzed from the entire environment in order to characterize the respective network. Omnidirectional antennas can be used for receiving signals in a frequency range associated with 5G FR1, namely signals in a frequency range that includes sub-6 GHz frequency bands in LTE. However, mobile network testing for millimeter waves, namely signals in a frequency range associated with 5G FR2, causes problems when using the industry-standard method. So far, the respective measurements for millimeter waves have to be done by a phased array, which however is an expensive solution since a dedicated control unit and phase shifters are required that also have an influence on the overall accuracy.

Accordingly, there is a need for a radio frequency scanner system as well as a method which ensure to perform mobile network testing in a cost-efficient and accurate manner, particularly of networks using frequency ranges associated with 5G FR2.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides examples of a radio frequency (RF) scanner system for mobile network testing. In an embodiment, the scanner system comprises a switched directional antenna assembly, a radio frequency receiver, and a positioning antenna assembly. The switched directional antenna assembly comprises several directional antennas oriented in different directions. The directional antennas of the switched directional antenna assembly are connected to at least one switch that is controlled by the radio frequency receiver. The positioning antenna assembly is configured to receive a global navigation satellite system (GNSS) signal. The radio frequency receiver is connected with the positioning antenna assembly, wherein the radio frequency receiver is configured to receive the GNSS signal from the positioning antenna assembly, which is indicative of the position and/or bearing. The radio frequency receiver is connected with the switched directional antenna assembly, wherein the radio frequency receiver is configured to receive an analog radio frequency signal from the switched directional antenna assembly, and wherein the radio frequency receiver is configured to process the analog radio frequency signal received, thereby converting the analog radio frequency signal to a baseband signal. The radio frequency receiver is configured to record information of the switching state of the switch. The radio frequency receiver is configured to gather information of the position and/or bearing. The radio frequency receiver is further configured to combine the information of the switching state, the baseband signal and the information of the position and/or bearing, thereby generating output metadata.

The main idea is that a switched directional antenna assembly with several directional antennas can be used in order to achieve a wide bandwidth scanning in a cost-efficient way while simultaneously having a small form factor. The switched directional antenna assembly and the positioning antenna assembly both are connected to the radio frequency receiver that is configured to process the respective data obtained from the respective antenna assemblies, for example in real time and simultaneously. Therefore, a clear correlation between the information obtained from both antenna assemblies can be ensured.

Moreover, the radio frequency receiver also obtains information concerning the switching state of the switch that is indicative of the respective directional antenna(s) of the several directional antennas of the switched directional antenna assembly being used for mobile network testing. In other words, information is gathered which of the several directional antennas has been switched or rather turned on when performing the respective measurement by the switched directional antenna assembly. In some embodiments, only a single or a defined number of antennas of the switched directional antenna assembly, namely a subset of all directional antennas, may be turned/switched on simultaneously, thereby contributing to the analog radio frequency signal that is forwarded to the radio frequency receiver for further processing.

The analog radio frequency signal is based on the individual signal(s) received at each of the directional antenna(s) of the switched directional antenna assembly, which is/are turned on during the respective measurement. In other words, the respective individual directional antenna(s) turned on contribute(s) to the analog radio frequency signal that is forwarded to the radio frequency receiver.

The switched directional antenna assembly may comprise N directional antennas, wherein N is any positive natural number, e.g. an even or uneven number.

Generally, each directional antenna of the switched directional antenna assembly is oriented in a different direction with respect to the other directional antennas. Hence, each of the directional antennas is orientated differently with respect to the other directional antennas. Put differently, N directional antennas may be provided that are oriented in N different directions.

Therefore, the beam width of the switched directional antenna assembly may be adapted depending on the number of directional antennas used simultaneously during a respective measurement, as they are oriented in different directions.

Accordingly, an antenna array with several non-directional antennas can be avoided. Consequently, phase shifters necessary when using such antenna arrays can be avoided as well, thereby reducing the costs. In addition, it is ensured that a bandwidth limitation does not occur, which is typically introduced by the phase shifters. Moreover, attenuation effects introduced by the phase shifters are also avoided, thereby improving the accuracy of the radio frequency scanner system.

In some embodiments, the radio frequency receiver has a first interface for the positioning antenna assembly and a second interface for the switched directional antenna assembly. Hence, the respective antenna assemblies are connected with the radio frequency receiver via the respective interfaces. For instance, the radio frequency receiver has dedicated connection ports that are used to connect the antenna assemblies, respectively.

In general, the radio frequency receiver receives the different information/data from the antenna assemblies connected, namely the analog radio frequency signal and the GNSS signal.

The analog radio frequency signal comprises information used for characterizing the mobile network, for example determining the respective performance, since the analog radio frequency signal is indicative of the characteristics of the mobile network.

Generally, the GNSS signal comprises information indicative of the position of the positioning antenna assembly receiving the GNSS signal, for example the scanner system that comprises several different components in defined geometrical relationship(s) such as the positioning antenna assembly.

In some embodiments, the GNSS signal may include information concerning latitude and/or longitude.

Moreover, the GNSS signal may also comprise a timing information such as a time stamp. Accordingly, the GNSS signal comprises information concerning latitude, longitude and/or time, e.g. timing information according to Coordinated Universal Time (UTC).

In addition, the GNSS signal may also comprise information concerning the bearing/orientation, for example the bearing/orientation of the positioning antenna assembly that receives the GNSS signal. Put differently, the bearing/orientation of the positioning antenna assembly can be determined based on GNSS signal received by the positioning antenna assembly.

Based on this information, the respective bearing/orientation of the switched directional antenna assembly, for example the respective bearing/orientation of each individual directional antenna, can be determined, e.g. by taking geometrical relationships and/or mechanical connections of the respective antenna assemblies with respect to each other into account.

Generally, the bearing/orientation can be determined for each component of the radio frequency scanner system, as the respective geometrical relationships and/or mechanical connections of these components are known.

In some embodiments, the geometrical relationships and/or mechanical connections of the respective antenna assemblies, namely the positioning antenna assembly and the switched directional antenna assembly, are known such that the bearing/orientation of each individual directional antenna can be determined based on the information received by the GNSS signal.

Accordingly, the scanner system, for example the radio frequency receiver, is configured to determine the position and/or bearing of the switched directional antenna assembly, for example the position and/or bearing of each individual directional antenna of the switched directional antenna assembly, by processing the GNSS signal received.

Hence, the GNSS signal is also indicative of the position and/or bearing of each individual directional antenna of the switched directional antenna assembly.

The different kinds of data/information obtained from the positioning antenna assembly is forwarded to the radio frequency receiver.

Since the radio frequency receiver is configured to control the respective switch that is associated with the switched directional antenna assembly for switching on/off the individual directional antennas of the switched directional antenna assembly, the radio frequency receiver also has information concerning the respective switching state of the switch. This information corresponds to information concerning the respective individual directional antenna(s) used during the respective measurement. Thus, the radio frequency receiver is enabled to determine which of the individual directional antenna(s) of the switched directional antenna assembly contributes to the analog radio frequency signal that is received from the switched directional antenna assembly.

Hence, the different kind of information can be combined by the radio frequency receiver in order to process the data/information obtained from the switched directional antenna assembly in an accurate manner.

The radio frequency receiver while obtaining the respective information/data is enabled to combine the respective information/data, namely the information of the switching state, the baseband signal obtained when processing the analog radio frequency signal, and the information of the position and/or bearing, thereby generating combined data that can be used for further processing. The respective combined data relates to metadata, namely output metadata since the respective metadata is outputted.

In some embodiments, the respective information/data obtained from different sources can be processed easily by a subsequent processing module that is connected with the radio frequency receiver. For instance, a standardized data format is outputted by the radio frequency receiver, wherein this data format ensures that the respective information/data is encompassed.

The GNSS data is used to know the position of the position antenna assembly, e.g. the scanner system or rather the individual components of the scanner system like the switched directional antenna assembly, when performing the mobile network testing, wherein this information together with the knowledge of the directional antenna(s) switched on ensures that it can be determined in which direction the scanner system, for example the switched directional antenna assembly, is pointing, namely the direction of the active directional antenna(s).

The overall measurement time can be reduced since the number of measurements can be reduced compared to the prior art solutions. Moreover, additional information, namely the direction of arrival of the radio frequency signals, is obtained when combining the information/data received accordingly.

In general, the bearing corresponds to information of at least one angle, namely azimuth and/or elevation. It is known that the bearing can be determined in different ways, e.g. by a pseudo-Doppler technique, Watson-Watt technique or correlative interferometer.

Moreover, a directional antenna, also called beam antenna, is an antenna which radiates or receives greater power in specific directions allowing increased performance and reduced interference from unwanted sources. In some embodiments, the directional antennas provide increased performance over dipole antennas—or omnidirectional antennas in general—when greater concentration of radiation in a certain direction is desired. Since the switched directional antenna assembly comprises several directional antennas oriented in different directions, increased performance is ensured, but omnidirectional scanning is enabled, e.g. at least in a subsequent manner.

An aspect provides that the baseband signal is, for example, a digital baseband signal and/or comprises in-phase and quadrature components (I/Q components). Thus, the radio frequency receiver that processes the analog radio frequency signal is configured to digitize the respective signal in order to obtain the digital baseband signal. Specifically, the radio frequency receiver may be configured to process the respective signal such that I/Q components are obtained that are indicative of the analog radio frequency signal.

Hence, the radio frequency receiver may generate the output metadata that encompasses I/Q data indicative of the analog radio frequency signal as well as control data indicative of the switching state of the switch, namely which of the several individual directional antenna(s) was/were turned on during the measurement, and position and/or bearing data.

Another aspect provides that the directional antennas are, for example, of the type Vivaldi. The Vivaldi antennas are also called tapered slot antennas (TSA). Generally, this type of antenna relates to a co-planar broadband antenna that can be established in a very compact manner. In addition, Vivaldi antennas can be manufactured in a cost-efficient way, wherein Vivaldi antennas have broadband characteristics.

Further, one to all of the directional antennas of the switched directional antenna assembly is/are switched on selectively during a single measurement stage such that the analog radio frequency signal is indicative of the signals received by the directional antenna(s) switched on during the single measurement stage. By using more than one directional antenna simultaneously, the beam width of the switched directional antenna assembly can be broadened, thereby adapting the receiving characteristics accordingly. Usually, only one directional antenna is active at the same time. However, several directional antennas may be switched on in a complex use case in order to obtain a broader beam. Further, all directional antennas may be switched on in a certain use case such that an omnidirectional scan can be performed if desired.

Further, the respective directional antennas in their OFF state, namely the directional antennas that are not switched/turned on, may forward a signal to the radio frequency receiver, which indicates that no contribution to the analog radio frequency signal is provided by them. In other words, the respective directional antennas switched off/turned off acknowledge the respective state to the radio frequency receiver accordingly. Thus, a fallback procedure is provided or redundancy can be ensured, which may be necessary in case that controlling the switch is not done in the intended manner Hence, the radio frequency receiver nevertheless obtains the information of the active directional antennas during the respective measurement stage.

The switched directional antenna assembly may be configured to be used as an omnidirectional antenna assembly. The switched directional antenna assembly can be used or rather operated as the omnidirectional antenna assembly in case that all of the directional antennas are oriented such that they provide omnidirectional characteristics and, further, all of these directional antennas are switched on simultaneously.

In addition, the scanner system may comprise a local oscillator that is configured to provide a clock signal used for controlling the switch. It can be ensured that each of the individual directional antennas is switched on in a subsequent and defined manner based on the clock signal provided by the local oscillator. In some embodiments, each of the individual directional antennas is operated or rather switched on for a predetermined time that is equal for all of the individual directional antennas due to the clock signal.

Further, the scanner system may comprise a storage medium. The storage medium may be associated with the radio frequency receiver such that the output metadata can be stored in the storage medium. The storage medium may be an internal storage medium, e.g. integrated in the radio frequency receiver, or rather an external storage medium, namely a separately formed storage medium. The storage medium may include any currently known or future developed computer readable storage medium.

In some embodiments, the output metadata provided by the radio frequency receiver is stored in the storage medium.

Moreover, the scanner system may comprise a down-converter. The down-converter may be a radio frequency down-converter that is used to down-convert the analog radio frequency signal, for example prior to digitizing the analog radio frequency signal. The down-converter may be nitrated in the radio frequency receiver or rather separately formed, for instance interconnected between the switched directional antenna assembly and the radio frequency receiver.

Another aspect provides that the scanner system comprises, for example, a magnetometer sensor that is configured to determine its orientation, thereby providing information of the bearing. Generally, the magnetometer sensor is configured to measure a magnetic field, a magnetic dipole moment, a direction, a strength, and/or a relative change of a magnetic field. The respective information sensed is used to determine the orientation of the magnetometer sensor itself, which in turn can be used to determine the orientation/bearing of any other component of the scanner system.

Again, the orientation/bearing of any other component of the scanner system can be determined due to the knowledge of the geometrical relationships of the respective component with respect to the magnetometer sensor.

Accordingly, it is sufficient that the positioning antenna assembly only provides information concerning the position, as the information concerning the bearing/orientation is obtained otherwise, namely by the magnetometer sensor. Accordingly, the positioning antenna assembly may be established in a less complex manner in case that the positioning antenna assembly only provides information concerning the position of the scanner system. Therefore, the costs of the radio frequency scanner system can be reduced further.

Thus, the scanner system, for example the radio frequency receiver, may be configured to determine the position of the switched directional antenna assembly, for example the position of each individual directional antenna of the switched directional antenna assembly, by processing the GNSS signal received. Hence, the GNSS signal is also indicative of the position of each individual directional antenna of the switched directional antenna assembly.

In addition, the scanner system, for example the radio frequency receiver, may be configured to determine the bearing/orientation of the switched directional antenna assembly, for example the bearing/orientation of each individual directional antenna of the switched directional antenna assembly, by processing the GNSS signal received or the information gathered from the magnetometer sensor. Hence, the GNSS signal or rather the sensor signal of the magnetometer sensor is also indicative of the bearing/orientation of each individual directional antenna of the switched directional antenna assembly.

In general, the radio frequency receiver may comprise a radio frequency chain. The radio frequency chain comprises components that are used for processing the analog radio frequency signal received from the switched directional antenna assembly. In some embodiments, the radio frequency chain comprises at least one amplifier, at least one filter and/or at least one analog-to-digital converter. The respective components are used for processing the analog radio frequency signal appropriately, thereby converting the analog radio frequency signal into the baseband signal, for example the I/Q components.

Moreover, the radio frequency receiver comprises a data processing circuit. The data processing circuit is used for processing data/information obtained. In some embodiments, the data-processing circuit is implemented by or includes, among other components, a central processing unit (CPU), a graphical processing unit (GPU), an application-specific integrated circuit (ASIC) and/or a field-programmable gate array (FPGA). The data processing circuit may generally process the data/information received from the different antenna assemblies, e.g. for providing the broadband signal, namely the I/Q components. In addition, the data processing circuit may be configured to generate the output metadata by processing the respective data/information obtained in an appropriate manner.

According to a further aspect, the scanner system is, for example, a movable scanner system that comprises a movable platform to which the switched directional antenna assembly, the radio frequency receiver and the positioning antenna assembly are connected such that mobile network testing can be performed while moving. In some embodiments, the movable platform may relate to a vehicle or a backpack such that the entire radio frequency scanner system can be moved during operation in order to perform the mobile network testing. In some embodiments, the mobile network testing can be done in the field.

Further, the scanner system may comprise a handheld device that comprises the switched directional antenna assembly and/or the positioning antenna assembly. The handheld device may be used by an operator, e.g. for interference hunting. The radio frequency receiver may be integrated in the handheld device as well. Alternatively, the radio frequency receiver is put into a bag that is carried by the operator during mobile network testing.

According to another aspect, the scanner system comprises, for example, a processing equipment that is configured to receive the output metadata generated for further processing. In some embodiments, the processing equipment is configured to perform a baseband processing and/or analysis. The processing equipment may be a separate component(s) that is connected to the radio frequency receiver, wherein the processing equipment is configured to extract data/information contained in the output metadata for further processing. Hence, the baseband signal encompassed in the output metadata may be processed/analyzed on its own or in combination with the other data/information contained in the output metadata.

Moreover, embodiments of the present disclosure also provide a method of mobile network testing by using the scanner system described above. In an embodiment, the method comprises the steps of:

Receiving a Global Navigation Satellite System (GNSS) signal by the positioning antenna assembly.

Receiving a (analog) radio frequency signal by the switched directional antenna assembly, Forwarding the Global Navigation Satellite System (GNSS) signal to the radio frequency receiver, Forwarding the (analog) radio frequency signal to the radio frequency receiver, Processing the (analog) radio frequency signal by the radio frequency receiver, thereby converting the (analog) radio frequency signal to a baseband signal, Recording information of a switching state of the switch by the radio frequency receiver, Gathering information of the position and/or bearing by the radio frequency receiver, and Combining the information of the switching state, the baseband signal and the information of the position and/or bearing by the radio frequency receiver, thereby generating output metadata.

Concerning further aspects and advantages, reference is made to the explanations given above that also apply to the method in a corresponding manner.

In summary, the switched directional antenna assembly of directional, for example Vivaldi-type, antennas is used to achieve wide bandwidth. The switched directional antenna assembly comprises the N directional antennas facing N directions, wherein each of the N directional antennas can be turned ON via the switch. The switch is controlled by the radio frequency receiver appropriately.

The radio frequency receiver simultaneously records the GNSS signal with positioning and/or bearing information, information regarding which directional antenna is ON, and the I/Q baseband data associated with the switched directional antenna(s).

All the information simultaneously obtained is combined by the radio frequency receiver, wherein the output metadata is generated. This metadata is passed to the separate processing equipment, for instance a laptop, tablet, PC, etc.), for further processing, e.g. baseband processing.

Due to the simultaneous processing, real-time processing is ensured. However, the combined information, namely the output metadata, may also be stored in the storage medium such that the further processing can be done subsequently.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
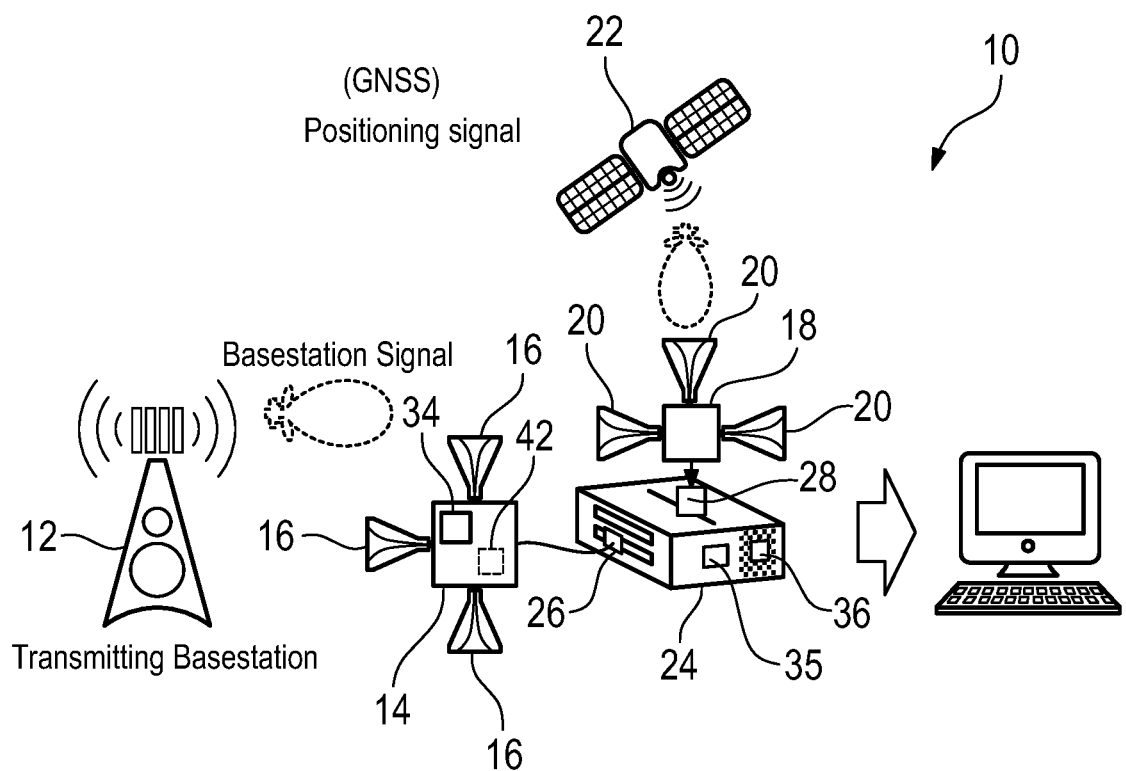
FIG. 1 schematically shows a representative radio frequency scanner system according to an embodiment of the present disclosure.

In FIG. 1, a radio frequency scanner system 10 is shown that is used for mobile network testing, e.g. testing a mobile network provided by a base station 12, also called transmitting base station. Generally, the radio frequency scanner system 10 may be used to determine the performance of the mobile network or for interference hunting, namely identifying any source of interfering signals.

In the embodiment shown in FIG. 1, the radio frequency scanner system 10 comprises a switched directional antenna assembly 14 having several directional antennas 16, for example antennas 16 of the type of Vivaldi, namely Vivaldi antennas, which are also called tapered slot antennas (TSA).

The several directional antennas 16 of the switched directional antenna assembly 14 are oriented in different directions. In some embodiments, all of the respective directional antennas 16 are oriented in a certain direction that is different from the one of another antenna 16 of the switched directional antenna assembly 14, thereby ensuring that each of the several directional antennas 16 is oriented towards a dedicated direction.

The radio frequency scanner system 10 may also comprise a positioning antenna assembly 18 that may also comprise several positioning antennas 20. In general, the positioning antenna assembly 18 is configured to receive a global navigation satellite system (GNSS) signal, for instance a GPS, Beidou, Galileo, GLONASS or similar positioning signal. The respective GNSS signal may be emitted by a satellite 22 as indicated in FIG. 1.

The radio frequency scanner system 10 may further comprise a radio frequency receiver 24 that has a first interface 26 to which the switched directional antenna assembly 14 is connected as well as a second interface 28 to which the positioning antenna assembly 18 is connected. Accordingly, both antenna assemblies 14, 18 are connected with the radio frequency receiver 24 that receives the respective signals from the antenna assemblies 14, 18 accordingly.

The radio frequency receiver 24 receives the GNSS signal from the positioning antenna assembly 18 via the second interface 28, wherein the respective GNSS signal is indicative of the position and/or bearing/orientation, for example the position and/or bearing/orientation of the positioning antenna assembly 18. However, the relative orientation of the positioning antenna assembly 18 with respect to the other components of the scanner system 10, for example the switched directional antenna assembly 14, e.g. each individual directional antenna 16, is known or rather predefined due to mechanical and/or geometrical relationships such that the radio frequency receiver 24 is enabled to determine the position and/or bearing of the other components of the scanner system 10 accordingly, for example the one of the switched directional antenna assembly 14, preferably of each individual directional antenna 16.

Since the radio frequency receiver 24 is also connected with the switched directional antenna assembly 14, the radio frequency receiver 24 also receives an analog radio frequency signal from the switched directional antenna assembly 14 that corresponds to the base station signal emitted by the transmitting base station 12 that has been received by at least one of the several directional antennas 16 of the switched directional antenna assembly 14.

The respective analog radio frequency signal received is internally processed by the radio frequency receiver 24 wherein the analog radio frequency signal is converted to a baseband signal for further processing.

Figure 2:
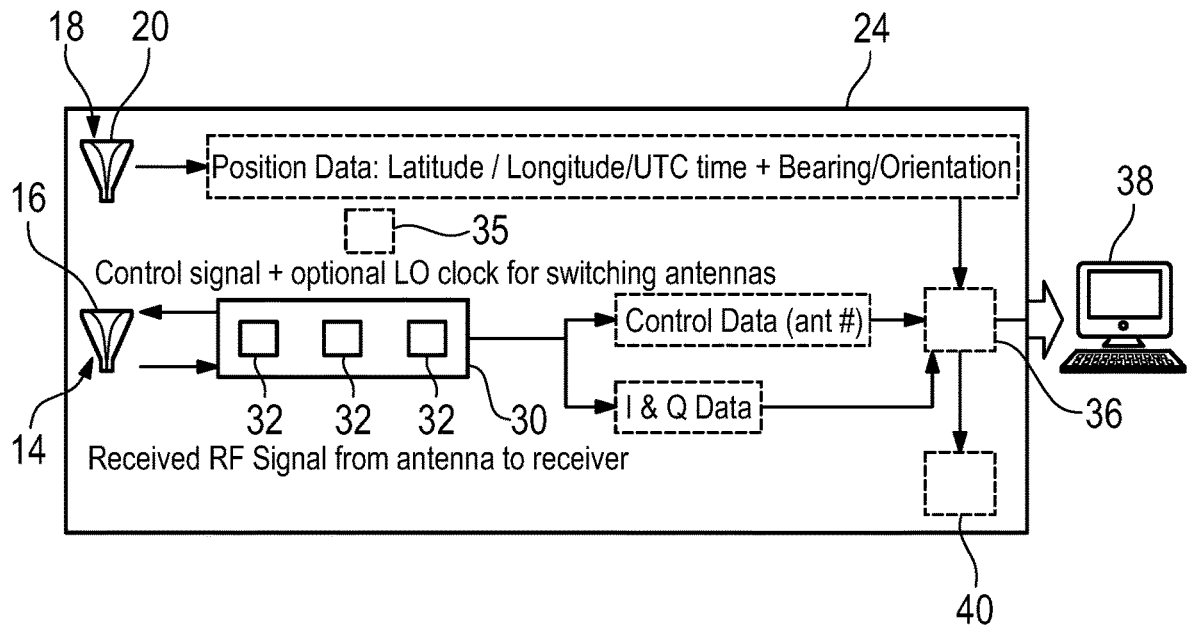
FIG. 2 schematically shows an overview illustrating data/information exchange within the radio frequency scanner system according to an embodiment of the present disclosure, and FIGS. 3A and 3B schematically show two specific embodiments of the radio frequency scanner system according to one or more aspects of the present disclosure.
Figure 2:
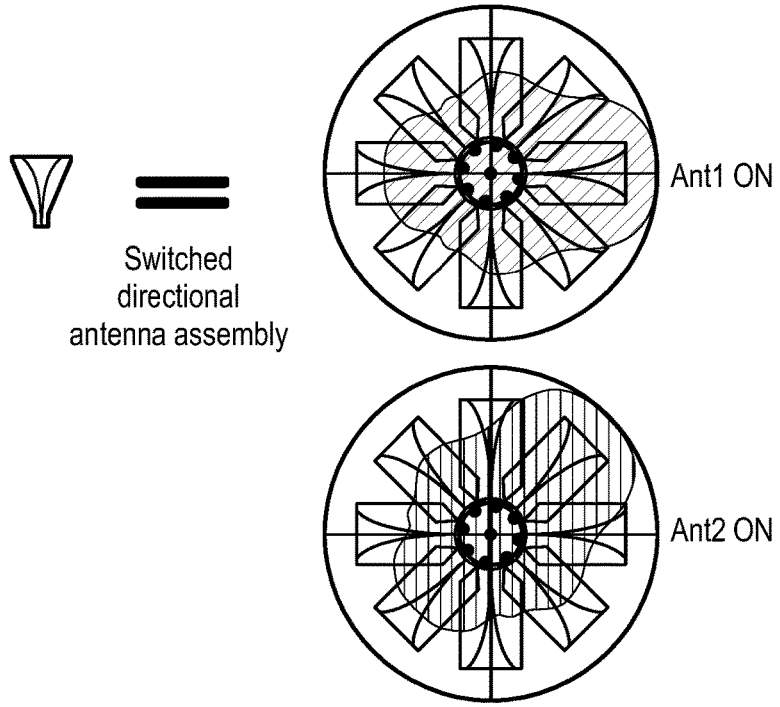

In FIG. 2, an overview is provided that illustrates the respective data/information exchange between the components of the scanner system 10, for example the antenna assemblies 18, 14 and the radio frequency receiver 24.

Thus, the radio frequency receiver 24 generally comprises a radio frequency chain 30 that has several components for processing the analog radio frequency signal. The respective components 32 may relate to a down-converter, an amplifier, a filter and/or an analog-to-digital converter. Generally, a down-converter may also be provided at the output of the radio frequency receiver 24.

The radio frequency receiver 24 is enabled to convert the analog radio frequency signal received from the switched directional antenna assembly 14 into a digital baseband signal, for example I/Q components, by processing the analog radio frequency signal by the components 32 of the radio frequency chain 30.

In some embodiments, the radio frequency scanner system 10 comprises at least one switch 34 that is controlled by the radio frequency receiver 24. The switch 34 may be integrated in the switched directional antenna assembly 14 as shown in FIG. 1, wherein the switch 34 has different switching states that define a certain subset of the several directional antennas 16 to be switched on wherein the other directional antennas 16 are switched off.

Generally, the different switching states may comprise states in which only one individual directional antenna 16 of the several directional antennas 16 of the switched directional antenna assembly 14 is switched on, whereas all other directional antennas 16 are switched off. However, further switching states may also comprise that more than one of the several directional antennas 16 are switched on simultaneously, thereby enlarging the beam width of the switched directional antenna assembly 14 used for receiving the base station signal.

In a certain embodiment, all of the several directional antennas 16 may be switched on simultaneously, thereby ensuring that the switched directional antenna assembly 14 is operated as an omnidirectional antenna.

The respective switch 34 is controlled by the radio frequency receiver 24 as also shown in FIG. 2 since the radio frequency receiver 24 forwards a respective control signal to the switch 34.

The radio frequency scanner system 10 may comprise a local oscillator 35 that provides a local oscillator signal used as a clock signal for controlling the switch 34 appropriately.

The local oscillator 35 may be integrated in the radio frequency receiver 24. In other words, the clock signal is used for switching the respective directional antennas 16 in a defined manner.

The radio frequency receiver 24 receives the respective information/data from the antenna assemblies 14, 18, namely the GNSS signal or rather information related thereto as well as the analog radio frequency signal associated with the base station signal of the transmitting base station 12. In addition, the radio frequency receiver 24 also has the information concerning the respective switching state of the switch 34 and, therefore, the respective directional antennas 16 of the switched directional antenna assembly 14. Accordingly, the respective information concerning the switching state relates to control data provided by the radio frequency receiver 24 as indicated in FIG. 2.

In other words, the radio frequency receiver 24 has information concerning the position and bearing/orientation, the control data, namely the switching state, as well as the baseband, e.g. I/Q data. The radio frequency receiver 24 processes the different information/data obtained, for example by a data processing circuit 36, wherein the data/information is combined, and thereby generating output metadata as indicated in FIG. 2.

In some embodiments, the data processing circuit 36 can be implemented by or include, among other components, a central processing unit (CPU), a graphical processing unit (GPU), an application-specific integrated circuit (ASIC) and/or a field-programmable gate array (FPGA). Any one of these processor structures in configured (e.g., programmed) to carry out the functionality set forth herein.

The output metadata generated may be forwarded via an output interface to a separately formed processing equipment 38, for instance a computer or laptop. The processing equipment 38 is configured to receive the output metadata generated for further processing, wherein the processing equipment 38 may perform a baseband processing, namely a digital signal processing, or an analysis of the respective information/data contained in the output metadata.

In some embodiments, the separately formed processing equipment 38 may process the individual data/information contained in the output metadata separately or in a combined manner in order to gather further deeper insights of the combined data/information.

As also shown in FIG. 2, the respective control data may provide information concerning the respective orientation/bearing of the respective directional antenna 16 switched on, e.g. Ant1 or Ant2, during the respective measurement, thereby providing a deeper insight which improves the performance characterization of the network to be tested, as information is obtained in which direction the scanner system 10 is pointing, for example the switched directional antenna assembly 14.

The scanner system 10, for example the radio frequency receiver 24, may also comprise a storage medium 40 that can be used to store data/information received, for instance the output metadata generated by combining the different information/data or rather data/information gathered.

In the shown embodiment, the storage medium 40 is connected with the data processing circuit 36 that receives and processes all information/data gathered by the radio frequency receiver 24.

In a certain embodiment, the scanner system 10 may have a magnetometer sensor 42 (illustrated in dashed lines in FIG. 1) that is configured to determine its orientation, thereby providing information of the bearing of the magnetometer sensor 42. The magnetometer sensor 42 may be associated with the switched directional antenna assembly 14 such that information concerning the orientation of the switched directional antenna assembly 14, for example each individual directional antenna 16, is provided by the magnetometer sensor 42.

However, the magnetometer sensor 42 may also be connected to the positioning antenna assembly 18 or rather any other component of the scanner system 10, as the relative orientations and/or connections between the individual components of the radio frequency scanner system 10 are known, thereby allowing to determine the relative orientation of each component of the radio frequency scanner system 10 accordingly.

Since the information concerning the bearing/orientation can be determined by the separately formed magnetometer sensor 42, it is not necessary to obtain the respective kind of information from the GNSS signal that is received by the positioning antenna assembly 18. In other words, the GNSS signal is only processed to obtain the position data, e.g. latitude, longitude and/or timing information such as UTC time.

Figure 3A:
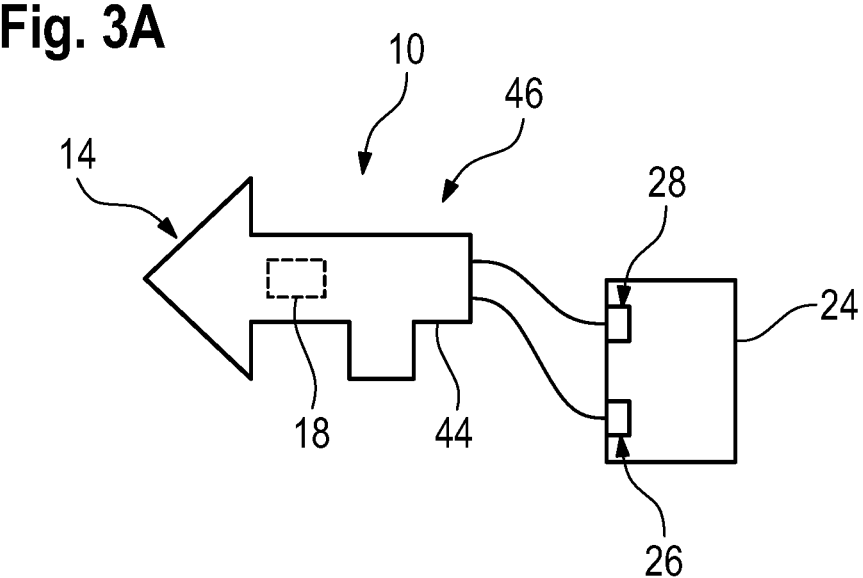

In FIG. 3A, a certain embodiment of the radio frequency scanner system 10 is shown, as the scanner system 10 comprises a handheld device 44 that can be carried by an operator of the radio frequency scanner system 10, for example for interference hunting.

In the handheld device 44, at least one of the antenna assemblies 14, 18, for example the switched directional antenna assembly 14 with the several directional antennas 16 is integrated. However, the handheld device 44 may also comprise the positioning antenna assembly 18 with the antennas 20.

In a certain embodiment, the handheld device 44 may also comprise the radio frequency receiver 24. Alternatively the radio frequency receiver 24 is provided separately, wherein the handheld device 44 is connected with the respective interfaces 26, 28 of the radio frequency receiver 24. The radio frequency receiver 24 may be carried by the operator, for instance in a backpack.

Accordingly, the entire radio frequency scanner system 10 may be a movable scanner system 10, as the handheld device 44 corresponds to a movable platform 46. Therefore, mobile network testing can be performed while moving, for instance walking in a field.

Figure 3B:
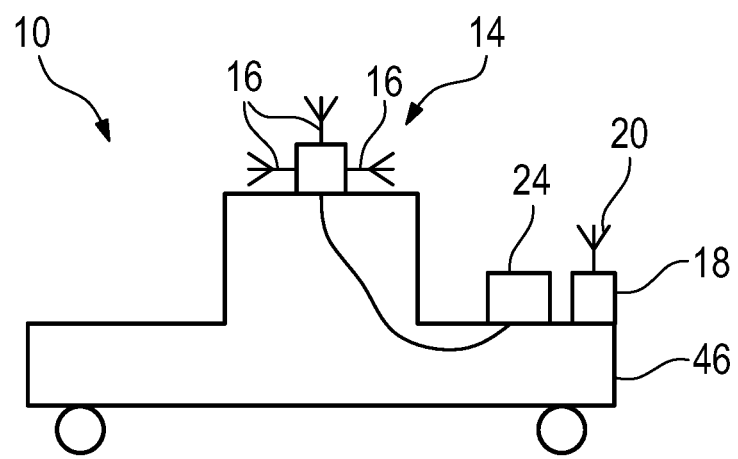

In FIG. 3B, an alternative embodiment of the scanner system 10 is shown, as the scanner system 10 comprises a motorized movable platform 46 like a vehicle.

As shown in FIG. 3B, the switched directional antenna assembly 14, the radio frequency receiver 24 and the positioning antenna assembly 18 all are mounted on the motorized movable platform 46 such that mobile network testing can be performed while moving in the field, for example driving.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some embodiments, the functionality described herein can be implemented by special purpose hardware-based computer systems or circuits, etc., or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A radio frequency (RF) scanner system for mobile network testing, comprising:
   a radio frequency receiver;
   a switched directional antenna assembly, wherein the switched directional antenna assembly comprises a plurality of directional antennas oriented in different directions, wherein the plurality of directional antennas of the switched directional antenna assembly are connected to at least one switch that is controlled by the radio frequency receiver, and wherein the at least one switch is configured to switch on and/or to switch off each directional antenna of the plurality of directional antennas independently of each other; and
   a positioning antenna assembly configured to receive a Global Navigation Satellite System (GNSS) signal,
   wherein the radio frequency receiver is connected with the positioning antenna assembly, wherein the radio frequency receiver is configured to receive the GNSS signal from the positioning antenna assembly, which is indicative of a position and/or bearing,
   wherein the radio frequency receiver is also connected with the switched directional antenna assembly, wherein the radio frequency receiver is configured to receive an analog radio frequency signal from the switched directional antenna assembly, and wherein the radio frequency receiver is configured to process the analog radio frequency signal received from the switched directional antenna assembly, thereby converting the analog radio frequency signal to a baseband signal,
   wherein the radio frequency receiver is configured to record information of the switching state of the switch, wherein the information comprises information concerning the respective directional antenna(s) used during a respective measurement thereby enabling the radio frequency receiver to determine which of the directional antenna(s) of the switched directional antenna assembly contribute(s) to the analog radio frequency signal that is received from the switched directional antenna assembly,
   wherein the radio frequency receiver is configured to gather information of the position and/or bearing, and wherein the radio frequency receiver is configured to combine the information of the switching state, the baseband signal and the information of the position and/or bearing, thereby generating output metadata.

2. The radio frequency scanner system according to claim 1, wherein the baseband signal is a digital baseband signal and/or comprises in-phase and quadrature components.

3. The radio frequency scanner system according to claim 1, wherein the directional antennas are of the Vivaldi type.

4. The radio frequency scanner system according to claim 1, wherein one to all of the directional antennas of the switched directional antenna assembly is/are switched on selectively during a single measurement stage such that the analog radio frequency signal is indicative of the signals received by the directional antenna(s) switched on during the single measurement stage.

5. The radio frequency scanner system according to claim 1, wherein the switched directional antenna assembly is configured to be used as an omnidirectional antenna assembly.

6. The radio frequency scanner system according to claim 1, further comprising a local oscillator that is configured to provide a clock signal used for controlling the switch.

7. The radio frequency scanner system according to claim 1, further comprising a storage medium.

8. The radio frequency scanner system according to claim 1, further comprising a down-converter.

9. The radio frequency scanner system according to claim 1, further comprising a magnetometer sensor that is configured to determine its orientation, thereby providing information of the bearing.

10. The radio frequency scanner system according to claim 1, wherein the radio frequency receiver comprises a radio frequency chain.

11. The radio frequency scanner system according to claim 10, wherein the radio frequency chain comprises at least one amplifier, at least one filter and/or at least one analog-to-digital converter.

12. The radio frequency scanner system according to claim 1, wherein the radio frequency receiver comprises a data processing circuit.

13. The radio frequency scanner system according to claim 1, wherein the scanner system is a movable scanner system that comprises a movable platform to which the switched directional antenna assembly, the radio frequency receiver and the positioning antenna assembly are connected such that mobile network testing can be performed while moving.

14. The radio frequency scanner system according to claim 1, further comprising a handheld device that comprises the switched directional antenna assembly and/or the positioning antenna assembly.

15. The radio frequency scanner system according to claim 1, further comprising one or more processor circuits configured to receive the output metadata generated for further processing.

16. The radio frequency scanner system according to claim 15, wherein the one or more processor circuits are configured to perform baseband processing and/or analysis.

17. A method of mobile network testing, the method comprising:
receiving a Global Navigation Satellite System (GNSS) signal by a positioning antenna assembly;
receiving, by a switched directional antenna assembly, a radio frequency signal, the switched directional antenna assembly comprising a plurality of directional antennas;
forwarding the Global Navigation Satellite System (GNSS) signal to a radio frequency receiver;
forwarding the radio frequency signal to the radio frequency receiver;
processing, by the radio frequency receiver, the radio frequency signal, thereby converting the radio frequency signal to a baseband signal;
recording, by the radio frequency receiver, information of a switching state of a switch, the information comprising information concerning the respective individual directional antenna(s) used during a respective measurement, thereby enabling the radio frequency receiver to determine which of the individual directional antenna(s) of the switched directional antenna assembly contribute(s) to the analog radio frequency signal that is received from the switched directional antenna assembly,
gathering information of the position and/or bearing by the radio frequency receiver, and
combining the information of the switching state, the baseband signal and the information of the position and/or bearing by the radio frequency receiver, thereby generating output metadata.

18. The method of claim 17, wherein the radio frequency receiver is configured to control the switch, the switch configured to switch on and/or off each directional antenna of the plurality of directional antennas independently of each other.

19. A radio frequency (RF) scanner system for mobile network testing, comprising:
a radio frequency receiver;
a switched directional antenna assembly, wherein the switched directional antenna assembly comprises a plurality of directional antennas oriented in different directions, wherein the plurality of the directional antennas of the switched directional antenna assembly are connected to at least one switch that is controlled by the radio frequency receiver, and wherein the switch is configured to switch on and/or to switch off each directional antenna of the plurality of directional antennas; and
a positioning antenna assembly configured to receive a Global Navigation Satellite System (GNSS) signal,
wherein the radio frequency receiver is connected with the positioning antenna assembly, wherein the radio frequency receiver is configured to receive the GNSS signal from the positioning antenna assembly, which is indicative of a position and/or bearing,
wherein the radio frequency receiver is also connected with the switched directional antenna assembly, wherein the radio frequency receiver is configured to receive an analog radio frequency signal from the switched directional antenna assembly and to process the analog radio frequency signal received from the switched directional antenna assembly to convert the analog radio frequency signal to a baseband signal,
wherein the radio frequency receiver is configured to record information of the switching state of the switch, wherein the radio frequency receiver is configured to gather information of the position and/or bearing, and wherein the radio frequency receiver is configured to combine the information of the switching state, the baseband signal and the information of the position and/or bearing, thereby generating output metadata, and
wherein the radio frequency receiver is configured to process the respective information obtained from the switched directional antenna assembly and the positioning antenna assembly in real time and simultaneously while obtaining a correlation between the information obtained from the switched directional antenna assembly and the positioning antenna assembly.

* * * * *